United States Patent
Kraus

(10) Patent No.: US 7,489,855 B2
(45) Date of Patent: Feb. 10, 2009

(54) SYSTEMS AND METHODS FOR DRIVING A LOAD

(75) Inventor: Richard A. Kraus, Farmington Hills, MI (US)

(73) Assignee: Infinson Technologies AG, Munich (DE)

( * ) Notice: Subject to any disclaimer, the term of this patent is extended or adjusted under 35 U.S.C. 154(b) by 145 days.

(21) Appl. No.: 11/496,674

(22) Filed: Jul. 31, 2006

(65) Prior Publication Data

US 2008/0025709 A1    Jan. 31, 2008

(51) Int. Cl.
G05F 1/10    (2006.01)

(52) U.S. Cl. .................. 388/815; 388/814; 388/811

(58) Field of Classification Search .......... 388/815, 388/814, 811
See application file for complete search history.

(56) References Cited

U.S. PATENT DOCUMENTS

| | | | | |
|---|---|---|---|---|
| 4,520,300 A | * | 5/1985 | Fradella | ...................... 318/603 |
| 4,935,641 A | * | 6/1990 | Wilhelm | ...................... 307/10.8 |
| 4,949,393 A | | 8/1990 | Ohmori et al. | |
| 5,454,114 A | | 9/1995 | Yach et al. | |
| 5,486,747 A | | 1/1996 | Welch | |
| 5,973,367 A | * | 10/1999 | Williams | ...................... 257/365 |
| 6,833,990 B2 | | 12/2004 | LaCroix et al. | |
| 6,980,441 B2 | * | 12/2005 | Man-ho | .................. 363/21.06 |
| 7,064,290 B2 | * | 6/2006 | Blankenship et al. | .. 219/130.51 |
| 2004/0052093 A1 | * | 3/2004 | Kim | ....................... 363/21.01 |
| 2005/0016974 A1 | * | 1/2005 | Myers et al. | .......... 219/130.51 |
| 2005/0218838 A1 | * | 10/2005 | Lys | ............................ 315/291 |
| 2006/0113980 A1 | * | 6/2006 | Yoshida | ...................... 323/282 |
| 2007/0013356 A1 | * | 1/2007 | Qiu et al. | ..................... 323/288 |

FOREIGN PATENT DOCUMENTS

DE    299 12 551 U    10/1999
JP    08 223 986 AA    8/1996

OTHER PUBLICATIONS

"High Current PN Half Bridge" NovalithIC™, BTS7960, Automotive Power, Data Sheet, Rev. 1.1, Dec. 7, 2004, 28 pgs.
Datenblatt SiP41104, Firma Vishay Siliconix, Apr. 19, 2004.

* cited by examiner

Primary Examiner—Rita Leykin
(74) Attorney, Agent, or Firm—Eschweiler & Associates, LLC

(57) ABSTRACT

One embodiment of the invention relates to a control system. A control system includes a controller configured to generate a drive signal as a function of a comparison between a first control signal and a second control signal, wherein the first control signal differs from the second control signal. A switching device is configured to generate an output control signal having a duty cycle that is a function of the drive signal. Other systems and methods are also disclosed.

16 Claims, 4 Drawing Sheets

SYSTEMS AND METHODS FOR DRIVING A LOAD

FIELD OF THE INVENTION

The present invention relates generally to a system and method for driving a load via a switching device. More particularly, the present invention relates to a system and method for driving a load, wherein a first and second control signal are utilized to generate a drive signal for driving the load.

BACKGROUND OF THE INVENTION

The sophistication of today's automobiles continues to increase, a trend driven by an ever-expanding suite of electronic control subsystems. As the number of electronic control subsystems increases, their integration is becoming a serious challenge for automakers. Generally, each subsystem is connected to other vehicle systems by way of one or more electrical connections (e.g., wires). Automakers generally would like to limit the number of connections between subsystems, because such connections adversely affect an automaker's bottom line. Thus, by limiting the number of connections between subsystems, automakers can deliver products that are more cost-competitive.

Of particular importance in automotive applications are so called current switches such as half-bridge current switches. Current switches are sometimes employed to drive motors by changing the current to the motor, which in turn changes the electrical flux near the motor to drive the motor's rotation. Like many other electronic control subsystems, existing current switches generally require several inputs to operate properly. Thus, existing current switches require several wires or other connections to connect to other vehicle subsystems. These connections are costly, especially given that current switches are typically located in densely packed and valuable vehicle locations.

As such, the present invention serves to simplify the integration of electronic control systems.

SUMMARY OF THE INVENTION

One embodiment of the invention relates to a control system. A control system includes a controller configured to generate a drive signal as a function of a comparison between a first control signal and a second control signal, wherein the first control signal differs from the second control signal. A switching device is configured to generate an output control signal having a duty cycle that is a function of the drive signal.

DETAILED DESCRIPTION OF THE INVENTION

The present invention will now be described with respect to the accompanying drawings in which like numbered elements represent like parts. The figures and the accompanying description of the figures are provided for illustrative purposes.

Figure 1:
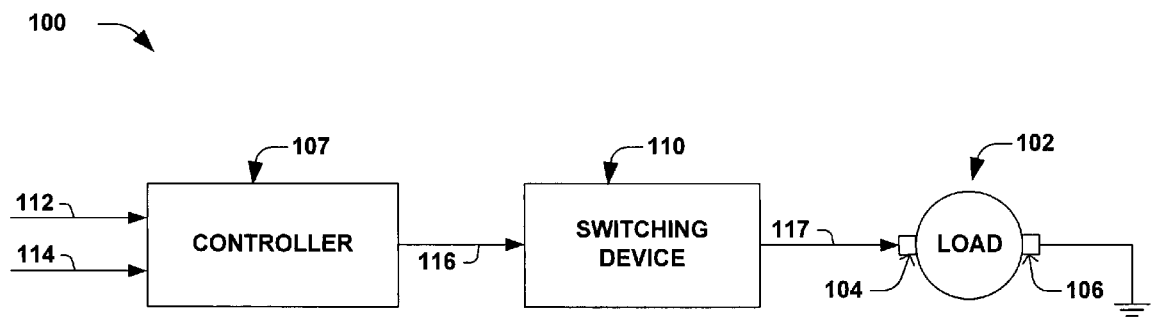
FIG. 1 is a schematic diagram illustrating one embodiment of a system for driving a load.

As shown in the illustrated embodiment in FIG. 1, aspects of the present invention relate to a control system 100 for driving a motor or some other load. The illustrated motor 102 has a first terminal 104 that is coupled to the output of a switching device, and a second terminal 106 that is coupled to ground. In one embodiment, the motor 102 is a brush-commutated motor that is operated in continuous current mode. Although the illustrated control system 100 is shown as driving a motor, it will be appreciated that control systems that drive loads other than a motor are contemplated as falling within the scope of the present invention.

The illustrated control system 100 includes a controller 107 and a switching device 110, which are operably coupled together to produce the appropriate on-off timing to required to drive the motor 102. To drive the motor, the controller 107 is configured to receive a first input signal 112 (e.g., a DC control current input) and a second input signal 114 (e.g., a frequency input), and further configured to generate a drive signal 116 in response thereto. As discussed further herein, the drive signal 116 can vary between a first state and a second state to effectuate control of the switching device 110. In response to the drive signal 116, the switching device 110 delivers an output control signal 117 (e.g., a drive current) to drive the motor 102, which can change the electrical flux near the motor thereby driving the motor's rotation at a desired speed.

In various embodiments, the controller 107 may be positioned in relation to the switching device 110 in one of several ways, including but not limited to: the controller 107 may be integrated into the same integrated circuit as the switching device; and the controller 107 may share a package with the switching device. In other embodiments, the controller 107 may share a circuit board with the switching device; the controller 107 may be located near to the switching device; or the controller 107 may be otherwise positioned relative to the switching device. The switching device 110 may comprise a half-bridge switching device, an H-bridge switching device, a metal-oxide semiconductor field effect transistor (MOSFET), bipolar junction transistor (BJT), or some other type of switching device(s).

Figure 2:
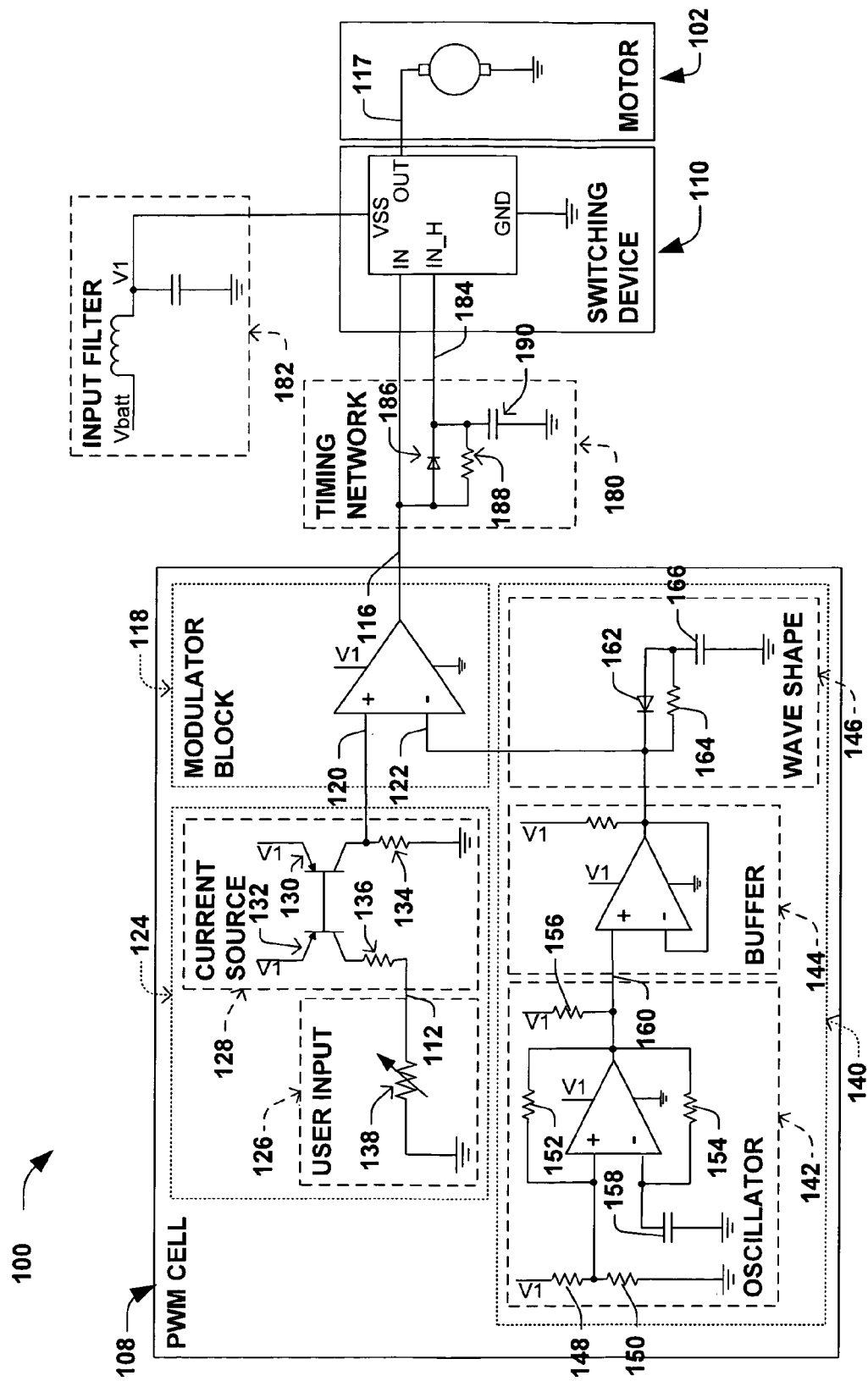
FIG. 2 is a block diagram illustrating one embodiment of a system for driving a motor.

Referring now to the illustrated embodiment in FIG. 2, one can see another embodiment in which a control system 100 for driving a motor 102 may be realized. As shown, one controller 107 may be a PWM cell 108 that includes one or more circuits and/or discrete devices that transform the signals on the first input 112 and second input into the drive signal 116. The first input 112 may be coupled to a DC control current and the second input may be coupled to a frequency input. FIG. 2's illustrated embodiment described below is only one embodiment of a control system, and other control systems are contemplated as falling within the scope of the present invention.

As shown, one PWM cell 108 may include a modulator block 118 to compare a first modulator input signal 120 to a second modulator input signal 122 and thereby deliver the drive signal 116 to the switching device 110. The illustrated modulator block 118 includes a comparator, which compares the voltage of the first modulator input signal 120 to the voltage of the second modulator input signal 122 and switches the state of the drive signal 116 to indicate which voltage is larger. The illustrated comparator could also compare the current of the first and second modulator input signals.

The first modulator input 120 is coupled to a user-manipulatable current source 124. The illustrated user manipulatable current source 124 includes a current source 128 and a user input 126. The illustrated current source 128 is coupled to the first modulator input 120 and includes a pair of PNP BJTs (130,132) that share a common gate. The emitters of the BJTs (130, 132) are coupled to a common node V1, and the collector of BJT 130 is coupled to the first modulator input 120. A resistor 134 develops a voltage on the first modulator input 120. One node of resistor 136 is coupled to the collector of BJT 132, while the other node of resistor 136 is coupled to the user input 126. The user input 126 can include an adjustable current source, adjustable resistor, etc. In one embodiment, an adjustable current source 124 is controlled by a rheostat 138 that is within reach of a vehicle occupant and that permits the user to adjust an automotive operating variable. For example, one rheostat 138 could allow a user to adjust the temperature via a vehicle's heating ventilation air conditioning (HVAC) unit (e.g., control the speed of the vehicle's blower motor). The user input 126 is advantageously designed to allow a manufacturer to couple the PWM cell 108 to vehicle components via a single electrical connection at 112, thereby easing integration of the PWM cell 108 and automotive components (e.g., HVAC unit).

The second modulator input 122 is coupled to a timing circuit 140. The timing circuit 140 allows selection or modification of the operating frequency and duty cycle of the control system. The illustrated timing circuit 140 includes an oscillator 142, a buffer 144, and a wave shape circuit 146.

The oscillator 142 of the illustrated timing circuit 140 includes a comparator that is coupled to several components that establish an RC time constant for the oscillator. Resistors 148 and 150 constitute a voltage divider and develop a voltage on one input node (e.g., positive terminal) of the comparator. Resistors 152, 154, and 156 are engineered so as to selectively allow the comparator to cause capacitor 158 to charge and discharge, thereby establishing an oscillating voltage 160 at the output of the oscillator, wherein the oscillating voltage 160 varies between V1 and GND. Other oscillator circuits are also contemplated as falling within the scope of the present invention. For example, other oscillator circuits may include variable resistors that allow a user to adjust a characteristic of the oscillator, including but not limited to frequency or duty cycle.

Buffer 144 of the illustrated timing circuit includes a comparator. The buffer separates the oscillating voltage 160 at the output of the oscillator 142 from the input signal of the wave shape circuit 146.

Wave shape circuit 146 is engineered to modify the oscillator voltage 160 in conjunction with the voltage of the user-manipulable current source 124 so as to facilitate the desired drive signal 116. The illustrated wave shape circuit 146 includes a diode 162 in parallel with a resistor 164, which are coupled to a first node of a capacitor 166. Thus, the RC time constant associated with the wave shape circuit alters the shape of the oscillator voltage pulse, so as to facilitate the desired drive signal.

In various embodiments, the control system 100 may also include a timing network and an input filter. If present, the timing network and/or input filter may be included in the PWM cell or the switching device in various embodiments.

One timing network 180 receives the drive signal 116 from the PWM cell 108 and provides a gated signal 184 therefrom. In various embodiments, the timing network 180 can include one or more circuits and/or discrete devices that transform the drive signal 116 into the gated signal 184. For example, FIG. 2 illustrates one embodiment of a timing network 180 that includes a diode 186 and a resistor 188 having a first node coupled to the PWM cell 108 and a second node coupled to the switching device 110; a capacitor 190 having a first node coupled to node 184 and a second node coupled to ground.

The input filter 182 may be coupled to a vehicle's battery and filters noise voltage that the battery causes. In automotive embodiments, in particular, large current and/or voltage requirements may cause the battery voltage to have significant ripple. For example, a typically automotive battery may provide a voltage of 14.2 V to the automotive electrical subsystems on node "Vbatt." Because of the significant electrical stresses associated with a vehicle's operation, this "Vbatt" node may have a ripple of about 1 to about 1.5 V. The input filter 182 aims to limit or minimize the ripple by delivering a voltage V1 to the control system 100. Notably, voltage V1 is referenced in each of the comparators of in the PWM cell, and is further referenced at various internal nodes of the PWM cell. By tying each of these comparators and nodes to V1, the PWM cell should be more stable and more resistant to noise from the battery voltage.

In another embodiment, the PWM cell can have an additional current detection input from a half-bridge current switching device. Such an embodiment allows current mode control of the output control signal to the motor by modifying the PWM characteristic of the drive signal.

Figure 3:
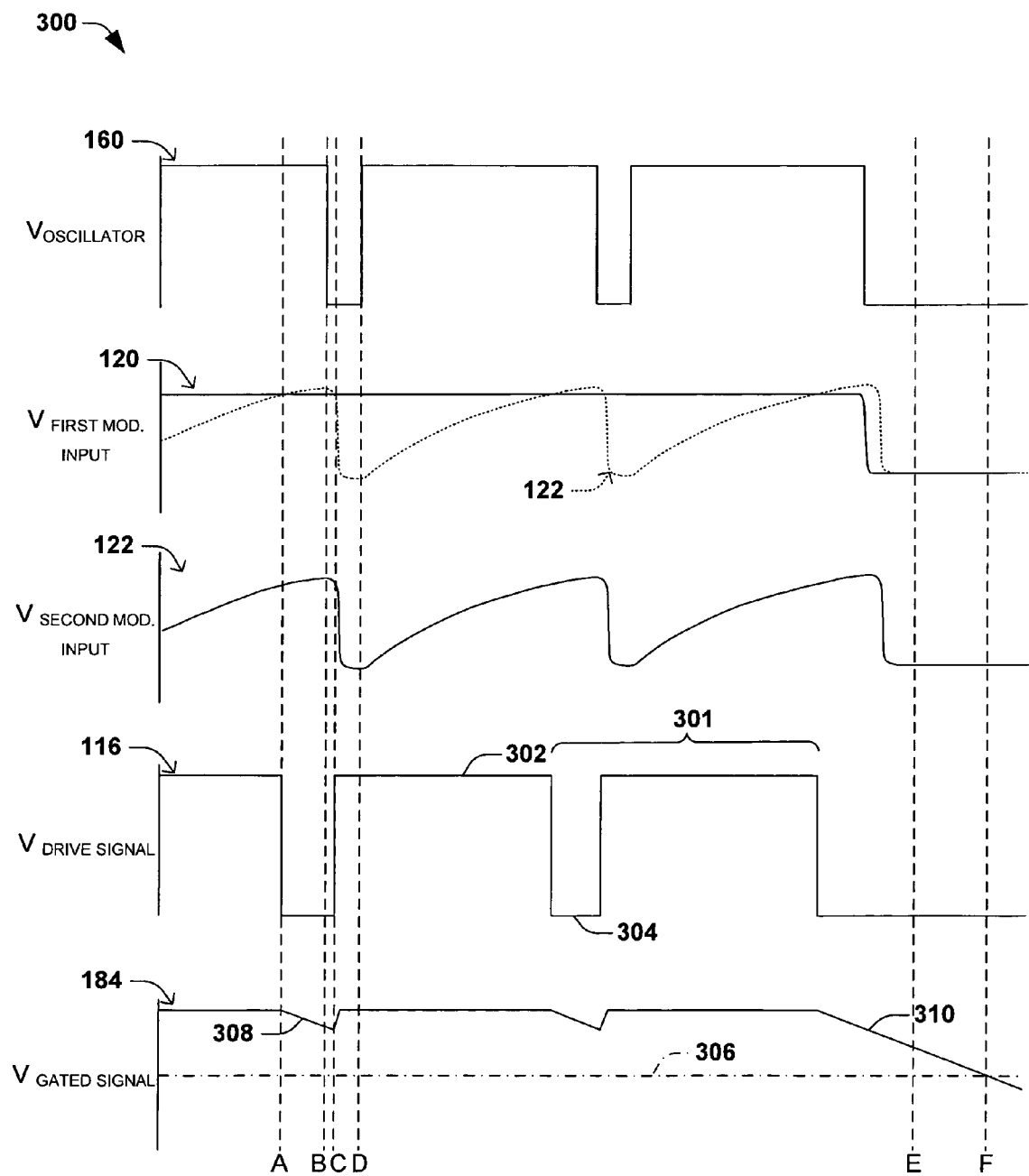
FIG. 3 is a set of timing diagrams illustrating timing characteristics for the control system illustrated in FIG. 2.

Referring now to FIG. 3, one can see a set of timing diagrams 300 or waveforms associated with the control system 100 of FIG. 2. These timing diagrams relate to the various components of the control system 100 and other systems of the invention that include suitable circuitry, state machines, firmware, software, logic, etc. to perform the various methods and functions illustrated and described herein, including but not limited to the exemplary methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of control systems which are illustrated and described herein (e.g., control system 100 in FIG. 1) as well as in association with other systems not illustrated, wherein all such implementations are contemplated as falling within the scope of the present invention and the appended claims. Further, although the description below may note that a voltage being high or low, it will be appreciated that these voltages could be switched (e.g., high voltage are low, low voltages are high) in other embodiments.

As previously noted, the drive signal 116 and gated signal 184 are provided to the switching device 110 to produce the appropriate on-off timing required to drive the motor 102 or other load in a desired manner. Thus, the drive signal 116 has a drive cycle or drive period 301 that varies between a first state 302 and a second state 304. One can also see that gated signal 184 may take more than one period of the drive signal 116 to drop below a predetermined threshold 306. During normal operating mode, if the gated signal 184 stays above the predetermined threshold 306, then the switching device 110 is "ON" and selectively supplies a high-side current or a low-side current to drive the motor 102. If, however, the gated signal 184 goes below the predetermined threshold 306, then the switching device 110 enters an inhibit mode or sleep state and no longer supplies a significant current to drive the motor 102. Thus, as shown in FIG. 3's illustrated embodiment, when the drive signal 116 goes low for an extended period of time (e.g., point "F", discussed below), the gated signal 184 likely falls below the threshold 306, thereby triggering the inhibit or sleep mode of the switching device 110.

As previously noted, drive signal 116 is generated by modulator block 118, and more specifically by comparing the voltage of the first modulator input 120 to the voltage of the second modulator input 122, for example by use of a comparator. The drive signal 116 transitions from the first state 302 to the second state 304 at point "A", wherein during the first state 302 (e.g., immediately prior to point "A") the voltage of the first modulator input 120 is greater than the voltage of the second modulator input 122, and during the second state 304 (e.g., immediately subsequent to point "A") the voltage of the second modulator input 122 is greater than the voltage of the first modulator input 120.

At point "B", the oscillator 142 changes state (e.g., oscillator voltage 160 drops low), causing the voltage of the second modulator input 122 to drop.

A point "C", the drive signal 116 transitions back to the first state 302. This transition occurs because the modulator block 118 (e.g., comparator) detects that the voltage of the second modulator input 122 quickly drops below the voltage on the first modulator input 120. Thus, notwithstanding the rise time associated with the drive signal, point "C" represents the transition point at which the voltage of the first modulator input 120 is once again greater than the voltage of the second modulator input 122.

At point "D", the oscillator voltage 160 transitions back to a high voltage, and as such the voltage on the second modulator input 122 again begins to increases (e.g., the capacitor 166 of the wave shape circuit 146 stores charge).

Points "A" through "D" then repeat for each successive oscillator pulse. At point "E", the user manipulates the current of the user-manipulable current source (e.g., changes rheostat 138), causing the voltage on the first modulator input to drop. Because the voltage on the first modulator input remains low, the drive signal remains in the second state 304 (e.g., low), which in turn causes the gated signal 184 to enter a prolonged decay region 310. Because the drive signal 116 remains in the second state 304 for a relatively long time, the gated signal 184 decays so as to fall below the predetermined threshold 306 of the switching device 110. As one can see, the gated signal 310 drops below the predetermined threshold 306, and the switching device 110 enters the sleep mode or inhibit mode at point "F."

In the illustrated embodiment, the gated signal 184 includes a series of decay regions (e.g., 308). As it relates to the embodiment in FIG. 1, the characteristics of the decay region 308 are determined by the RC time constant associated with timing network 180 (e.g., diode 186, resistor 188, and capacitor 190). For example, when the drive signal 116 enters the first state 302 (e.g., goes high), the gated signal 184 tracks the drive signal closely (e.g., rises quickly). This behavior occurs because diode 186 is forward biased and capacitor 190 charges quickly, causing a fast rise-time for gated signal 184. So long as the drive signal 116 remains high, the gated signal 184 also remains high. However, when the drive signal 116 transitions to the second state 304 (e.g., goes low), charge leaks from capacitor 190, causing the voltage of the gated signal 184 to drop in the decay region 308. Thus, in the illustrated embodiment in FIG. 2, one can adjust the characteristics of the decay region 308 by adjusting the values of capacitor 190, resistor 188, and/or diode 186. Thus, one can adjust the time required for the gated signal 184 to drop below the predetermined threshold 306.

As FIG. 3 shows, the timing network 180 may be engineered such that the gated signal 184 takes more than one period of the drive signal 116 to drop below a predetermined threshold 306 by which the switching device is placed into an inhibit mode or sleep state. More precisely, the (prolonged) decay region 308 (310) of the gated signal 184 may be engineered to cross the predetermined threshold 306 at a predetermined time to place the current switching device 110 in inhibit mode or sleep mode. In particular embodiments, the predetermined threshold 306 corresponds to an operational threshold of the switching device 110.

Figure 4:
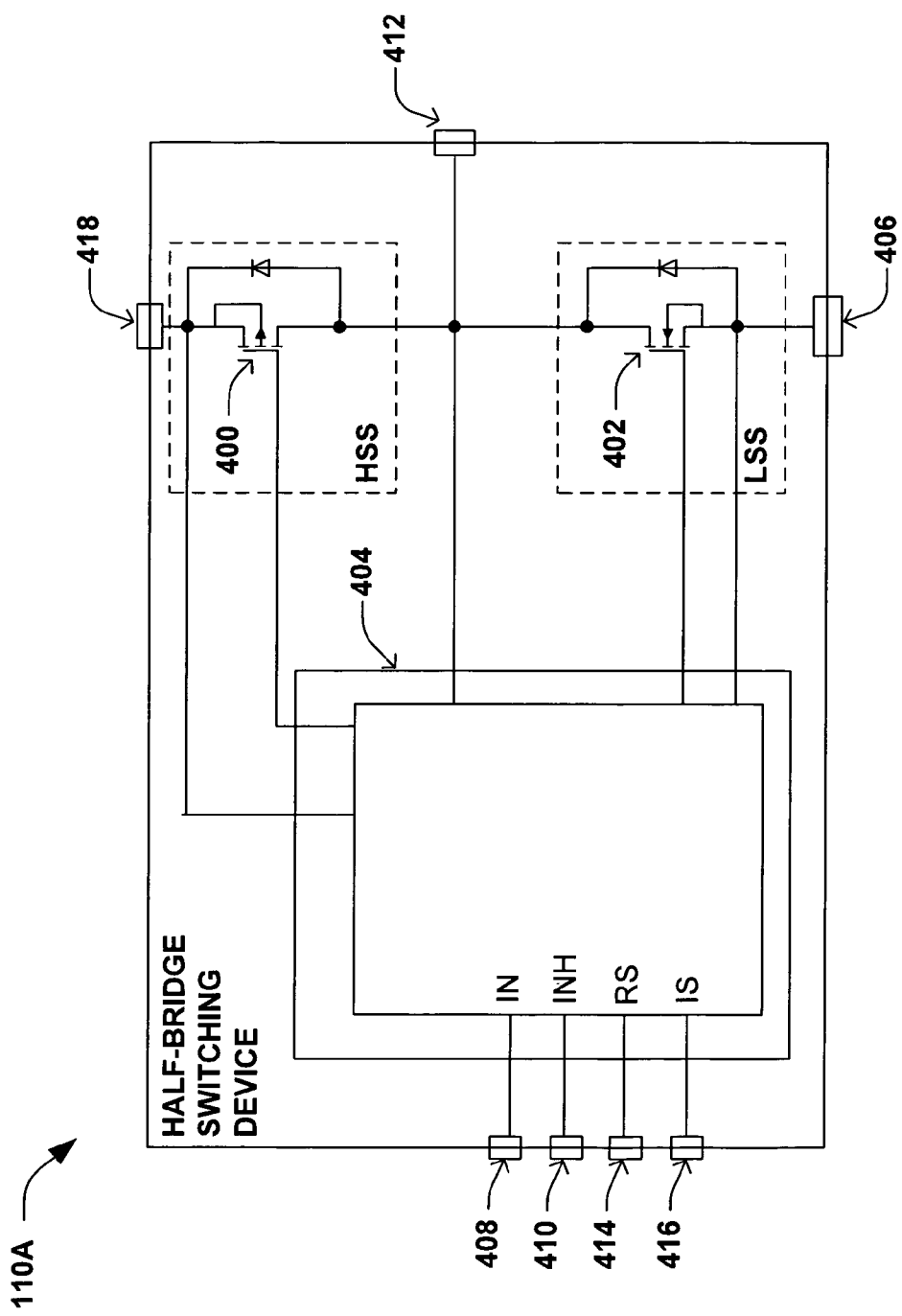
FIG. 4 is a block diagram illustrating one embodiment of a half-bridge switching device.

FIG. 4 is a block diagram illustrating one embodiment of a half-bridge switching device 110A. In the illustrated embodiment, the half-bridge switching device 110A is a high current half bridge for motor drive applications. In other embodiments, the half bridge switching device 110A can be used for other suitable applications. In the illustrated embodiment, the half bridge switching device 110A includes a p-channel high side MOSFET 400 (HSS 400), an n-channel low side MOSFET 402 (LSS 402) and an integrated driver 404. The half-bridge switching device 110A has signal inputs and outputs that include GND 406, which is ground, IN 408 which defines whether the HSS 400 switch or the LSS 402 switch is activated, INH 410 which when set to low puts the half-bridge switching device into a sleep mode, OUT 412 which is the power output of the half-bridge switching device 110A, SR 414 which is for adjusting the slew rate by connecting a resistor between SR and GND, IS 416 which is an output for current sense and diagnosis and that defines whether the HSS 400 switch or the LSS 402 switch is activated, and VS 418 which is a voltage supply input. In other embodiments, other suitable inputs or outputs can be used.

In the illustrated embodiment, switching device 110A operates in accordance with the following truth table:

| Device State | Inputs | | Outputs | | | Mode |
| --- | --- | --- | --- | --- | --- | --- |
| | INH | IN | HSS | LSS | IS | |
| Normal Operation | 0 | X | OFF | OFF | 0 | Stand-by |
| | 1 | 0 | OFF | ON | 0 | LSS active |
| | 1 | 1 | ON | OFF | CS | HSS active |

For example, in one embodiment of the switching device 110A, the INH pin 410 is an inhibit pin. When the INH pin 410 is low, the switching device 110A goes into standby mode and draws a nominal amount of current (e.g., in one embodiment less than 100 micro-amps, or less than 15 micro-amps) to minimize battery drain. Only when the inhibit pin is high is the switching device 110A in an active mode (see truth table above). When in active mode, if the IN pin 408 is low, then the LSS 402 switch is active. When in active mode, if the IN pin 408 is high, then the HSS 400 switch is active. Thus, in embodiments using the switching device 110, one can tie the drive signal 116 to the IN pin 408 and the timing network 180. Such an arrangement provides a gated signal 184 that can be tied to the INH pin 410. The OUT pin 412 can be tied to the motor, thereby effectuating the desired control.

In various embodiments, the half-bridge switching device 110A accommodates load switching and pulse width modulation in excess of a predetermined frequency. In various embodiments, the predetermined frequency may be a supersonic frequency above 15 kHz. In one embodiment, the predetermined frequency is approximately 20 kHz. In other embodiments, the predetermined frequency can be other suitable values.

In various embodiments, the half-bridge switching device 110A may be combined with other components (including another half-bridge switching device 110A) to form H-bridge and 3-phase drive configurations.

Although the invention has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A control system, comprising:
   a controller configured to generate a drive signal as a function of a comparison between a user defined threshold signal and a second control signal, the user defined threshold signal differing from the second control signal;
   a timing circuit that is coupled to the controller and adapted to provide the second control signal, wherein the second control signal is representative of a frequency; and
   a switching device configured to generate an output control signal having a duty cycle that is a function of the drive signal;
   wherein the timing circuit comprises:
      an oscillator configured to generate an oscillating voltage signal having a rise time; and
      a wave shape circuit configured to derive the second control signal from the oscillating voltage such that the second control signal has a rise time that is greater than the rise time of the oscillating voltage signal.

2. The control system of claim 1, wherein the controller is configured to control the duty cycle of the output control signal.

3. The control system of claim 2, wherein the switching device has an on-state mode of operation, and further comprising:
   a timing network that is configured to output a gated signal to the switching device, wherein the gated signal maintains a relationship with a predetermined threshold during the on-state mode of operation of the switching device, and maintains another, different relationship with the predetermined threshold during an off-state mode of the switching device.

4. A control system, comprising:
   a p-channel high-side MOSFET for providing a high-side current and voltage;
   an n-channel low-side MOSFET for providing a low-side current and voltage;
   a driver integrated circuit for selectively controlling the p-channel high-side MOSFET and the n-channel low-side MOSFET; and
   a controller configured to receive a first control signal and a second control signal, and to provide a drive signal to the driver integrated circuit based on a comparison of the first and second control signals, the controller comprising:
      a modulator block having a first input related to the first control signal, a second input related to the second control signal, and an output configured to generate the drive signal;
      a user-manipulatable current source coupled to the first input of the modulator block;
      an oscillator configured to generate an oscillating voltage signal having a rise time; and
      a wave shape circuit configured to derive the second control signal from the oscillating voltage signal such that the second control signal has a rise time that is greater than the rise time of the oscillating voltage signal.

5. The control system of claim 4, wherein the p-channel high-side MOSFET, the n-channel low-side MOSFET, the driver integrated circuit, and the controller are integrated in a single integrated circuit package.

6. A method for driving a load with a current switching device, comprising:
   providing a drive signal via a controller, wherein the drive signal is generated as a function of a first control signal and a second control signal that is different from the first control signal; and
   receiving a drive signal at a current switching device, wherein the current switching device is capable of driving the load in response thereto, and wherein the drive signal comprises a pulse width modulation signal comprising a first state and a second state during an on-state of the load; and
   processing the drive signal to generate a gated signal with a decay region, the decay region engineered to cross a predetermined threshold at a predetermined time to place the current switching device in an off-state of the load.

7. The method of claim 6, further comprising:
   providing the first control signal in response to a user-manipulatable current control that is capable of being positioned within the reach of a vehicle occupant.

8. The method of claim 7, wherein the control system has a single connection coupleable to the user-manipulatable current control to ease integration of the control system into a vehicle.

9. The method of claim 6, further comprising:
   providing the second control signal as a function of an oscillator.

10. A method for driving a motor with a current switching device, comprising:
   providing a drive signal via a pulse width modulator cell, wherein the drive signal is generated as a function of a dynamically adjustable user input and a frequency input;
   receiving a drive signal at the current switching device, wherein the current switching device is capable of driving the motor in response thereto, and wherein the drive signal comprises a pulse width modulation signal comprising a first state and a second state during an on-state of the motor; and
   processing the drive signal to generate a gated signal with a decay region, the decay region engineered to cross a predetermined threshold at a predetermined time to place the current switching device in an off-state of the motor.

11. The method of claim 10, wherein the decay region begins at a time associated with the transition from the first and second state of the drive signal.

12. The method of claim 11, wherein the decay region alleviates at a time associated with the transition from the second state back to the first state.

13. A system for driving a motor, comprising:
pulse-width modulation means for providing a drive signal from a user-manipulatable current source and a frequency input;
a current switching circuit for generating an output control signal as a function of the drive signal in an on-state mode of operation, wherein the output control signal is capable of driving a motor; and
a user-manipulatable device for controlling the user-manipulatable current source;
wherein a single connection is coupleable to the user-manipulatable current source to ease integration.

14. The system of claim 13, further comprising:
a timing network for providing a gated signal to the current switching circuit wherein the gated signal maintains a relationship with a predetermined threshold during the on-state mode of operation of the current switching circuit, and maintains another, different relationship with the predetermined threshold during an off-state mode of the current switching circuit.

15. A control system, comprising:
a controller configured to generate a drive signal as a function of a comparison between a first control signal and a second control signal, the first control signal differing from the second control signal;
a switching device configured to generate an output control signal having a duty cycle that is a function of the drive signal; and
a timing network that is configured to output a gated signal to the switching device, wherein the gated signal maintains a relationship with a predetermined threshold during an on-state mode of operation of the switching device, and maintains another, different relationship with the predetermined threshold during an off-state mode of the switching device.

16. A control system, comprising:
a controller configured to generate a drive signal as a function of a comparison between a first control signal and a second control signal, the first control signal differing from the second control signal; and
a switching device configured to generate an output control signal having a duty cycle that is a function of the drive signal;
wherein the first control signal comprises a threshold signal that is adapted to be dynamically altered by a user.

* * * * *

UNITED STATES PATENT AND TRADEMARK OFFICE
CERTIFICATE OF CORRECTION

PATENT NO. : 7,489,855 B2  
APPLICATION NO. : 11/496674  
DATED : February 10, 2009  
INVENTOR(S) : Richard A. Kraus It is certified that error appears in the above-identified patent and that said Letters Patent is hereby corrected as shown below:

On the title page, item [73]:  
Under the Assignee section; please replace "Infinson Technologies AG" with --Infineon Technologies AG--

Signed and Sealed this

Thirty-first Day of March, 2009

JOHN DOLL  
*Acting Director of the United States Patent and Trademark Office*